United States Patent
Ami et al.

(10) Patent No.: US 7,529,237 B2
(45) Date of Patent: May 5, 2009

(54) METHOD AND DEVICE FOR COMMUNICATING PACKETS

(75) Inventors: Junko Ami, Tokyo (JP); Yoshiaki Takabatake, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 874 days.

(21) Appl. No.: 10/073,281

(22) Filed: Feb. 13, 2002

(65) Prior Publication Data

US 2002/0131388 A1  Sep. 19, 2002

(30) Foreign Application Priority Data

Feb. 19, 2001  (JP)  ............................. 2001-042210

(51) Int. Cl.
  *H04L 12/56* (2006.01)
(52) U.S. Cl. .................. 370/389; 370/395.43
(58) Field of Classification Search ................ 370/338,
  370/349, 347, 412, 469, 437, 319, 337, 503,
  370/255, 280, 294, 466, 335, 342, 311, 350,
  370/510, 465, 328, 329, 313, 395.5, 232,
  370/282, 253, 254, 348, 321, 322, 323, 324,
  370/327, 442, 376, 330, 395.52, 395.53,
  370/395.6, 441, 352–356, 278, 474
  See application file for complete search history.

(56) References Cited

U.S. PATENT DOCUMENTS

| 5,487,061 | A | * | 1/1996 | Bray | 370/252 |
|---|---|---|---|---|---|
| 5,499,238 | A | * | 3/1996 | Shon | 370/399 |
| 5,504,744 | A | * | 4/1996 | Adams et al. | 370/232 |
| 5,784,358 | A | * | 7/1998 | Smith et al. | 370/230 |
| 6,167,030 | A | * | 12/2000 | Kilkki et al. | 370/236 |
| 6,215,767 | B1 | * | 4/2001 | Li | 370/230 |
| 6,374,112 | B1 | * | 4/2002 | Widegren et al. | 455/452.2 |
| 6,473,434 | B1 | * | 10/2002 | Araya et al. | 370/412 |
| 6,483,854 | B1 | * | 11/2002 | Klausmeier et al. | 370/474 |
| 6,549,938 | B1 | * | 4/2003 | Kilkki et al. | 709/207 |
| 6,556,572 | B1 | * | 4/2003 | Ishida | 370/395.41 |
| 6,587,457 | B1 | * | 7/2003 | Mikkonen | 370/356 |
| 6,608,813 | B1 | * | 8/2003 | Chiussi et al. | 370/218 |
| 6,654,363 | B1 | * | 11/2003 | Li et al. | 370/338 |
| 6,693,892 | B1 | * | 2/2004 | Rinne et al. | 370/348 |
| 6,721,324 | B1 | * | 4/2004 | Shinohara | 370/395.1 |
| 6,882,623 | B1 | * | 4/2005 | Goren et al. | 370/230 |
| 6,977,930 | B1 | * | 12/2005 | Epps et al. | 370/392 |
| 6,999,416 | B2 | * | 2/2006 | Wang et al. | 370/230 |
| 7,209,471 | B2 | * | 4/2007 | Hong | 370/349 |
| 2001/0015963 | A1 | * | 8/2001 | Tuomainen et al. | 370/311 |
| 2002/0041592 | A1 | * | 4/2002 | Van Der Zee et al. | 370/389 |
| 2002/0051448 | A1 | * | 5/2002 | Kalkunte et al. | 370/389 |
| 2003/0021262 | A1 | * | 1/2003 | Ma et al. | 370/352 |
| 2003/0235202 | A1 | * | 12/2003 | Van Der Zee et al. | 370/428 |

(Continued)

*Primary Examiner*—Gregory B Sefcheck
(74) *Attorney, Agent, or Firm*—Oblon, Spivak, McClelland, Maier & Neustadt, P.C.

(57) ABSTRACT

Communication packets having a same channel identifier are exchanged between a pair of Bluetooth devices within a Bluetooth network. The packets are passed to a lower level layer through a connection handle in which their requested quality of service is indicated. In the lower level layer, the communication packets are distributed to buffers, each of which corresponds to each type of quality of service set in the connection handle. Alternatively, a service identifier corresponding to the quality of service is given to the communication packets in the lower level layer, and the packets are distributed to a suitable buffer based on the service identifier.

2 Claims, 10 Drawing Sheets

PROVIDING A BUFFER FOR EVERY DIFFERENT SERVICE CLASS (INDEPENDENT FROM SCO LINK)

U.S. PATENT DOCUMENTS

| | | | |
|---|---|---|---|
| 2004/0198223 A1* | 10/2004 | Loh et al. | 455/41.1 |
| 2004/0223475 A1* | 11/2004 | Hong | 370/338 |
| 2004/0223512 A1* | 11/2004 | Hong | 370/466 |
| 2005/0058144 A1* | 3/2005 | Ayyagari et al. | 370/401 |
| 2005/0207388 A1* | 9/2005 | Rinne et al. | 370/347 |
| 2006/0037028 A1* | 2/2006 | Adermann et al. | 719/321 |

* cited by examiner

FIG. 1 EXAMPLE WHERE MULTIPLE SLAVES REQUESTING DIFFERENT TYPES OF COMMUNICATION QUALITY ARE CONNECTED TO ONE MASTER

FIG. 2 EXAMPLE WHERE MULTIPLE APPLICATIONS REQUESTING DIFFERENT TYPES OF COMMUNICATION QUALITY ARE OPERATING

FIG. 3 FLOW OF COMMUNICATION DATA

FIG. 4 SYSTEM CONFIGURATION DIAGRAM

FIG. 5 PROVIDING A BUFFER FOR EVERY DIFFERENT SERVICE CLASS (INDEPENDENT FROM SCO LINK)

FIG. 6  CORRESPONDENCE 1 BETWEEN L2CAP CHANNEL AND CONNECTION HANDLE

FIG. 7  CORRESPONDENCE 2 BETWEEN L2CAP CHANNEL AND CONNECTION HANDLE

FIG. 8 CORRESPONDENCE 1 BETWEEN CONNECTION HANDLE AND BUFFER

FIG. 9 CORRESPONDENCE 2 BETWEEN CONNECTION HANDLE AND BUFFER

FIG. 10A  ACL PAYLOAD HEADER EXAMPLE 1

FIG. 10B  ACL PAYLOAD HEADER EXAMPLE 2

FIG. 11  EXAMPLE OF QUALITY CONTROL FLOWCHART

FIG. 12 PROVIDING A BUFFER FOR EACH DIFFERENT SERVICE CLASS (INCLUDING SCO LINK)

FIG. 13 EXAMPLE 1 WHERE THERE IS A SERVICE USED BY THE OTHER ACL LINK

FIG. 14 XAMPLE 2 WHERE THERE IS A SERVICE USED BY THE OTHER ACL LINK

FIG. 15

METHOD AND DEVICE FOR COMMUNICATING PACKETS

BACKGROUND OF THE INVENTION

1. Field of the Invention

The present invention relates to a communication method over a Bluetooth™ network, and more particularly to a Bluetooth network communication method for implementing radio communication in accordance with a quality required for different kinds of communication services.

2. Description of the Related Art

Bluetooth is a standard wireless technology for connecting digital devices such as mobile telephones, mobile computers and digital, electric home appliances in a radio manner in order to exchange data including images and voices. The area available for the connection through the Bluetooth is the order of 10 meters radius, which is less than the connection distance of the conventional radio LAN. However, it can be achieved with a lower cost and an easier configuration. Further, since its low power consumption leads expectations to be used as a communication medium between digital devices within a local area network.

In a Bluetooth network, one or a plurality of Bluetooth devices, each of which is called "slave", are connected in the radio manner to one Bluetooth device called "master". Here, each of the Bluetooth devices includes a radio interface compliant with the Bluetooth Standard. Each slave can perform different kinds of radio-communications with the master.

For example, in an example shown in FIG. 1, a personal computer (PC) (called master 1 hereinafter) compliant with the Bluetooth Standard is used as a master, to which multiple devices are connected in the radio manner. A headset 2, which is one of the slaves, performs voice communication through Synchronous Connection-Oriented (SCO) that is a form of connection suitable for voice transmission in real time. On the other hand, a mouse 3, which is a PC peripheral device, also has a Bluetooth interface and transmits sequential signals to the master 1 in the radio manner in asynchronous with clock signals. The communication in this case is performed in a form of connection called Asynchronous Connection-less (ACL). Further, a viewer 4 transmits image data to the master 1 in the radio manner.

Figure 15:
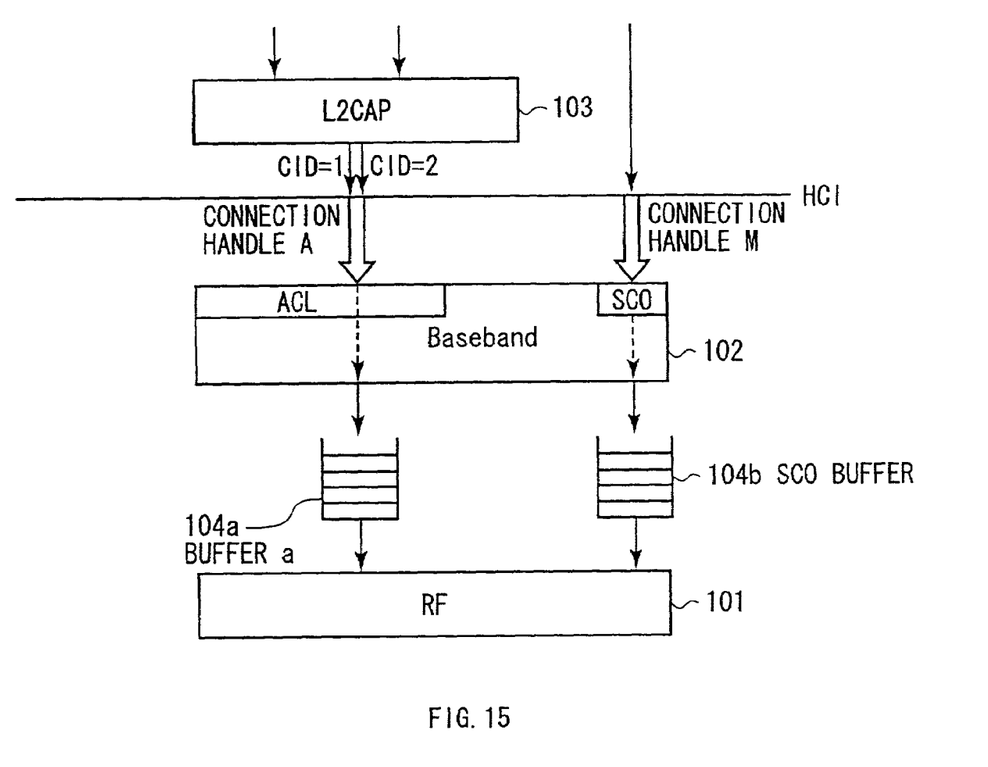
FIG. 15 is a diagram of a configuration of a protocol layer in the conventional Bluetooth network.

FIG. 15 shows a protocol layer configuration in a conventional Bluetooth network. In a lowest RF (radio) layer 101, regulations required for antenna control and/or radio transmission are defined. A baseband 102 is a physical layer and handles regulations for managing physical channels and links. Further, the configuration includes an a Logical Link Control Adaptation Protocol (L2CAP) 103 via a Host Controller Interface (HCI).

The L2CAP layer 103 further regulates ACL data services to protocols in upper layers and sets a logical channel for each service. As Quality of Service (QoS) options, QoS parameters including the token rate, token packet size, peak bandwidth, latency and delay variation can be defined for each logical channel. Further, a primitive called HCI_QoS_Setup is prepared for the HCI, and the same QoS parameters as the above can be defined for each connection handle.

According to the conventional system shown in FIG. 15, a channel is set in accordance with a given type of quality of service in the L2CAP level. However, one connection handle for the ACL link is used by the protocol in the L2CAP layer 103 for one Bluetooth interface. More precisely, there is only one connection handle for the ACL link for the Bluetooth interface for a pair of a sender and a receiver (for example, one slave and one master shown in FIG. 2).

The connection handle is like an identifier for identifying a connection link. In the example in FIG. 15, only one connection handle A is commonly used for all of communication services requiring data when the pair of the slave and the master exchanges asynchronous signals via the ACL link.

Therefore, logical channels specified in the upper L2CAP layer 103 for a plurality of types of communication services (that is, for respective QoS), respectively, performed between one slave and the master are bundled in the single connection handle A in the lower baseband layer 102. Thus, processing corresponding to the communication quality required by each logical channel cannot be performed.

Furthermore, there is a single buffer 104a only, corresponding to one ACL link, in order to accommodate packets via (or utilizing) the ACL link. Thus, even when different communication quality is required by the upper level layer, the same quality of communication service is provided to all packets via (or utilizing) the ACL link.

Figure 2:
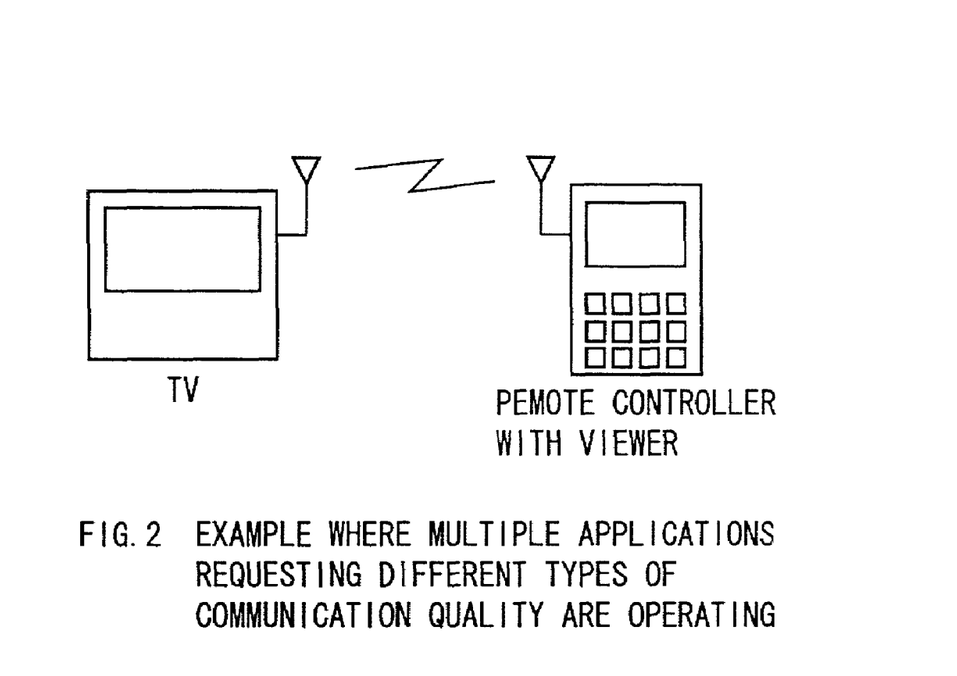
FIG. 2 is a diagram showing an example where multiple applications requesting different types of communication quality are operating in the Bluetooth network.

For example, when a viewer shown in FIG. 2 requires two services of video transmission and keyboard operation (or mouse operation) via the ACL link, communication services, one of which handles the continuity of images and the other of which achieves faster responses, are required for the video transmission and the keyboard operation, respectively. In the L2CAP, logical channels corresponding to these two services are defined, and channel ID's are given, respectively. However, the communication processing is performed through the same quality of services as a result. Thus, the video requiring the continuity may be played intermittently, or, conversely, a command operation requiring a quick response may be delayed.

In this way, in the conventional Bluetooth network communication, communication reflecting the QoS parameter for each logical channel is not performed.

SUMMARY OF THE INVENTION

Accordingly, in order to overcome the above-described problem in the conventional Bluetooth network, it is an object of the present invention to provide a system and a method for achieving communication which meets every required quality when data communications co-exist which require a plurality of different kinds of quality between a pair of Bluetooth devices.

In order to achieve the above-described object, the present invention is intended to apply to a Bluetooth network including a plurality of Bluetooth devices having a radio interface compliant with the Bluetooth Standard. Particularly, when different types of quality of communication service are attempted between a pair of Bluetooth devices at the same time, the present invention allows communication processing in accordance with respective types of quality to be performed.

In such a Bluetooth network, each radio interface compliant with the Bluetooth Standard specifies a plurality of buffers in accordance with a plurality of different types of service quality required by communication packets exchanged between a pair of Bluetooth devices. Then, when the communication packets require communication control in accordance with service quality, the required service quality is specified. The communication packets are distributed to corresponding buffers, respectively. Thus, the service quality having identified in an upper level (for example, L2CAP layer) keeps the identity in lower levels, which allows processing of communication data transmitted by each Bluetooth device in a form best suitable for the communication service quality required by the device.

More specifically, according to one aspect of the present invention, there is provided a method where, in a Bluetooth network including multiple Bluetooth devices with a radio interface based on the Bluetooth Standard, N buffers are set. Here, N is a number corresponding to a number of types of quality of service requested by a communication packet exchanged with the other narrow-band radio communication device, that is the other communicating party. The quality of service requested by the communication packet is set in an upper level layer, such as an application layer and an L2CAP layer, in the Bluetooth protocol layer. When set in the L2CAP layer, the quality of service is written by using the L2CAP QoS option or HCL_QoS_Setup in order to specify the quality of service (QoS).

Next, a logical channel is set sequentially in the communication packet. Here, information indicating the quality of service requested by the communication packet using the logical channel is set in the logical channel.

Next, one connection handle (connection identifier) is given to the logical channel used by the communication packet through a control interface to a lower level layer (baseband layer). Then, set the information indicating the quality of service preset in the corresponding logical channel in the connection handle.

Finally, the communication packet passed to the lower level layer through the connection handle is distributed to a corresponding buffer among the N buffers based on the connection handle and the information indicating the quality of service set in the connection identifier.

According to this aspect, the communication packet with one logical channel and one connection identifier corresponding the logical channel is transmitted to the lower level layer in accordance with the requested service. Then, it is determined whether or not there is a request for control over the quality of service. If so, a service identifier corresponding to the service class is given to the communication packet. The communication packet is distributed to the corresponding buffer in accordance with the service identifier.

According to another aspect of the present invention, there is provided a method where, in a Bluetooth network including multiple Bluetooth devices with a radio interface based on the Bluetooth Standard, N buffers are set. Here, N is a number corresponding to a number of types of quality of service requested by a communication packet exchanged with the other narrow-band radio communication device, that is the other communicating party.

Next, one connection handle (connection identifier) is set in, for each quality of service requested by the communication packet, the logical channel used by the communication packet. In this case, the quality of service requested by a series of communication packets having the same channel identifier (CID) is specified to the communication packet exchanged over the Bluetooth network in the upper level layer (such as L2CAP layer) in the Bluetooth hierarchy structure. The quality of service is specified by specifying a parameter of a service requested by a series of L2CAP packets having the same channel identifier in the QoS option of the L2CAP packet in accordance with an instruction from an application, for example. Through the interface from the upper level to the lower level in the Bluetooth protocol layer hierarchy, the same connection handle (connection identifier) is given to each communication packet (L2CAP packet) having the same QoS parameter in one to one correspondence regardless of the value of the channel identifier for the packet.

Next, the connection handle of the communication packet passed to the lower level layer is associated with one of the N buffers based on the types of quality of service.

Finally, the communication packet is distributed to the corresponding buffer based on the type of quality of service and the connection handle.

According to both of the above-described methods, the quality of service requested by the communication packet corresponds to the buffer in which the communication packet is stored, and the processing suitable for the type of the quality of service is performed ultimately.

According to another aspect of the present invention, there is provided a method where a service class requested by the transmitting Bluetooth device is set in a predetermined area of a payload header of a communication packet passed from an upper level layer to a lower level layer. The service class is specified based on service information specified in the connection handle used for passing the communication packet to the lower layer.

Next, the predetermined area in the payload header is checked, and the service class requested by the communication packet is determined based on the service information specified in the predetermined area.

Finally, the communication packet is distributed to a buffer corresponding to the specified service class based on the determination.

The service information may be specified in the predetermined area by writing a specific value (00) in the L_CH area in the payload header, for example. This approach is effective for a case where a communication packet sent from the upper level layer is fragmented in proper length in the baseband layer.

Further, when any specific value is not written in the predetermined area in the payload header, the communication packet may be distributed to a default buffer.

According to the above-described communication method in the Bluetooth network, data exchanged within the network is processed in a form best suitable for the quality of service requested by each Bluetooth device.

According to another aspect of the present invention, there is provided a Bluetooth network system including multiple Bluetooth devices with a radio interface based on the Bluetooth Standard. In this network system, each Bluetooth device includes an application processing portion for determining a parameter corresponding to quality of communication service requested by an application used in the Bluetooth device for a communication packet transmitted by the communication device, a plurality of buffers, whose number corresponds to a number of types of the parameter, a logical link control portion, a communication control interface portion, and a determination portion. The logical link control portion prepares a logical channel in which information regarding the parameter determined for the communication packet and sets the logical channel sequentially in the communication packet. The communication control interface portion is connected between the logical link control portion and the determination portion and gives a connection handle (connection identifier) to the set logical channel. Then, the communication control interface portion sets information regarding the parameter in the connection handle. The determination portion distributes to one suitable buffer among the plurality of buffers the communication packet passed from the logical link control portion via the communication control interface based on the parameter information in which the connection handle of the communication packet is set.

The communication control interface portion may give one connection handle to each logical channel and set information regarding the parameter in the connection handle.

Alternatively, the communication control interface portion may give a connection handle for each type of the information regarding the parameter to the logical channel and set the information regarding the parameter in the connection identifier.

The Bluetooth device may further include a packet processing portion for writing the information regarding the parameter in a predetermined area in the communication packet passed from the logical link control portion. In this case, the determination portion distributes the communication packet to a suitable buffer among the plurality of buffers based on the information regarding the parameter written in the predetermined area of the communication packet.

The packet processing portion may write a value 00 in a first area of a header of the message packet, and the determination portion may distribute the message packet to the suitable buffer if the value of the first area is 00.

Further, the packet processing portion may write a value 00 in a first area of a header of a message packet and write a service definition indicating the quality of communication in a second area. In this case, the determination portion may distribute the message packet to the suitable buffer based on the service definition if the value of the first area is 00.

By configuring the Bluetooth network with the Bluetooth devices as described above, communication processing corresponding to the quality of service requested by data exchanges between a pair of Bluetooth devices can be performed in the exchange of message within the network.

The other features and effects of the present invention will be more apparent from detail description below with reference to attached drawings.

DESCRIPTION OF THE PREFERRED EMBODIMENTS

Figure 1:
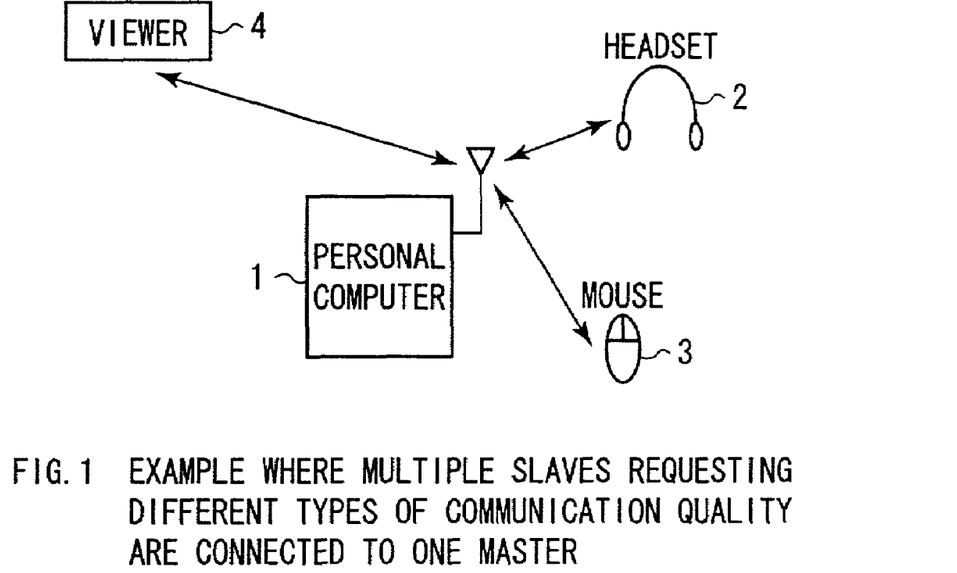
FIG. 1 is a diagram showing an example where multiple slaves requesting different types of communication quality are connected to one master in a Bluetooth network.

FIG. 1 is a diagram showing an example of a network configuration to which a Bluetooth network communication method according to the present invention is applied. Multiple Bluetooth devices 2, 3 and 4, which are slaves, are connected to a personal computer 1 which is a master in a radio manner. Each device includes a radio interface based on the Bluetooth Standard. The slaves radio-transmit data at the next timing of receiving a polling packet from the master 1.

In the example in FIG. 1, a headset 2 requires voice communication through Synchronous Connection-Oriented (SCO), which is a form of connection suitable for real time voice transmission. A mouse 3 and a viewer 4 perform radio communication through Asynchronous Connection-less (ACL) which is a form of connection suitable for communication from peripheral devices of the personal computer to the body. Even using the same ACL link, the mouse 3 requests a service which gives higher response speed preference, while the viewer 4 requests a service which gives the continuity of images preference.

FIG. 2 shows another example of a Bluetooth network configuration. In the example in FIG. 2, a remote controller with a viewer, which is a single slave, requires to a television, which is a master, different types of communication quality based on multiple applications such as easy image transmission and channel control. Especially as shown in FIG. 2, the present invention is suitable for a case where the implementation of different quality types of communication services are attempted at the same time.

Figure 3:
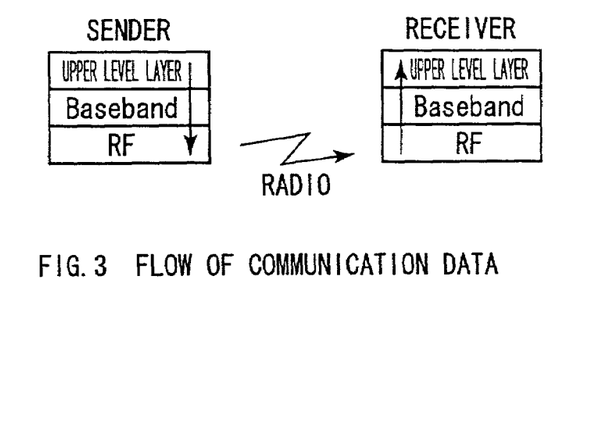
FIG. 3 is a diagram showing, on a protocol stack, a flow of communication from a sender to a receiver in the Bluetooth network.

FIG. 3 shows a data flow in a communication layer over the Bluetooth network. In a sending side (for example, the remote controller with the viewer in FIG. 2), a logical channel corresponding to each communication service is identified at an upper layer and is modulated at a baseband. Then, the information is transmitted from an RF layer by using a free space as a medium. In turn, the receiving side (for example the television in FIG. 2) receives a carrier wave at the RF layer, which is then demodulated at the baseband. Then, the information is identified at the upper layer to perform requested processing.

Figure 4:
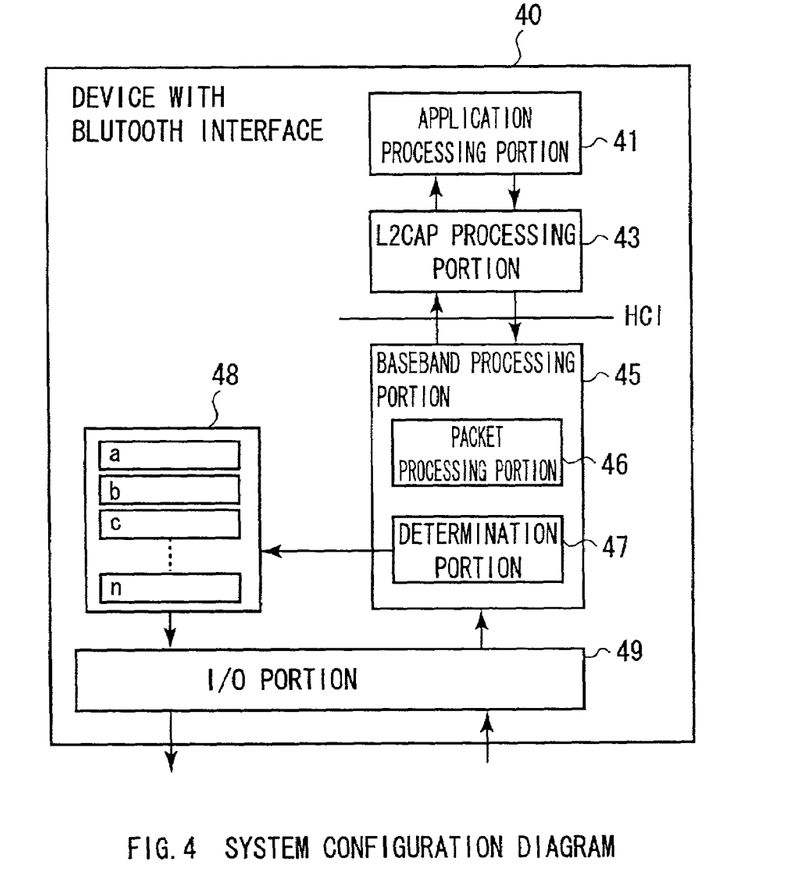
FIG. 4 is a diagram showing an example of a system configuration of a Bluetooth device to which a method according the present invention is applied.

FIG. 4 shows a hardware configuration of the Bluetooth device shown in FIGS. 1 and 2. A Bluetooth device 40 includes an application processing portion 41, an L2CAP processing portion 43 which is connected to the application processing portion 41, a baseband processing portion 45 which is connected to the L2CAP processing portion 43, a plurality of buffers 48, and an I/O portion 49 for performing input and output of data to/from the other Bluetooth device. Notably, an HCI interface exists between L2CAP processing portion 43 and the baseband processing portion 45.

The application processing portion 41 determines a parameter corresponding to the quality of a communication service required by a given application, for a communication packet to be exchanged with the other Bluetooth device. The L2CAP processing portion 43 functions as a logical link control portion and specifies a logical channel in accordance with the communication service required by the given application. A parameter corresponding to the service quality may be determined by the L2CAP processing portion 43 instead of the application processing portion 41. In that case, the L2CAP processing portion 43 specifies a QoS option. At the HCI, a connection handle corresponding to the service quality is given to the communication packet, which is then sent to the baseband processing portion 45.

The baseband processing portion 45 has a determination portion 47 for checking the service quality specified for the received communication packet and for distributing the communication packet to one of buffers in accordance with the quality. Further, the baseband processing portion 45 has a packet processing portion 46 for processing, if required, a packet sent from the L2CAP processing portion 43. The packet processing portion 46 gives a service identifier corresponding to the service quality specified in the application processing portion 41 or the L2CAP processing portion 43 to the received communication packet as necessary. The processing for giving a service identifier is performed by writing a predetermined value in a predetermined area of the baseband packet when adjusting communication data in the received communication packet to the proper packet (baseband packet) size, for example. In this case, the determination portion 47 checks the predetermined area of the processed packet and distributes the packet to a buffer corresponding to the communication service.

The application processing portion 41 corresponds to the upper level layer in the protocol layer configuration in FIG. 3. The L2CAP processing portion 43 is located at the middle level. However, for simple description, the L2CAP processing portion 43 is included in the upper level layer in FIG. 3 according to the present invention. In the present invention, control corresponding to quality of service described later is performed in the L2CAP processing portion 43 and the baseband processing portion 45.

Figure 5:
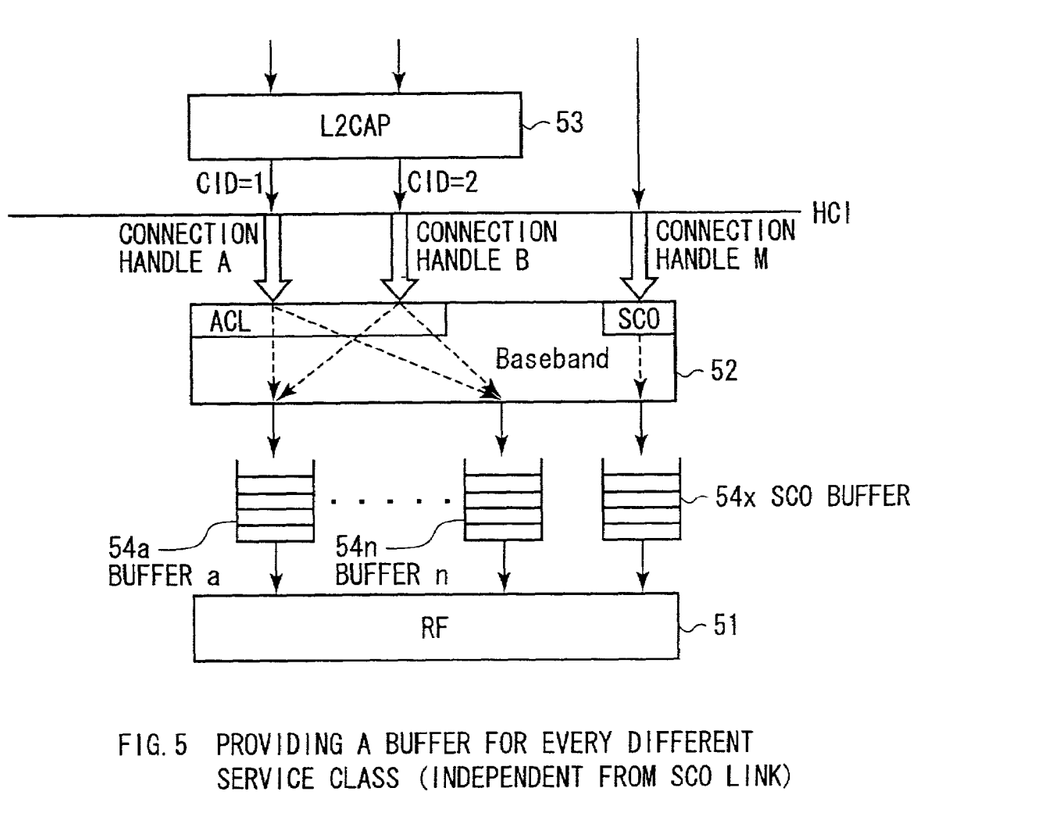
FIG. 5 is a diagram of a protocol layer configuration where a buffer is provided for each different service class on an ACL link.
Figure 6:
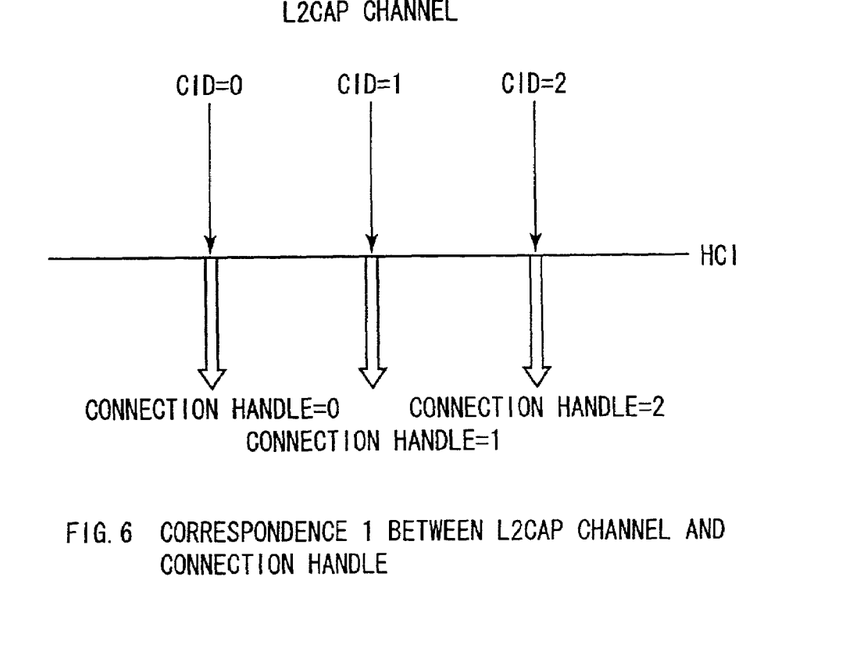
FIG. 6 is a diagram showing an example of correspondence between an L2CAP channel and a connection handle.

FIG. 5 shows an example of the protocol layer configuration according to the present invention, which can provide services corresponding to requested quality when communications with different types of quality are performed at the same time.

A feature of the layer configuration shown in FIG. 5 is to specify, in the HCI for the pair of Bluetooth devices for performing data exchanges, multiple connection handles for the ACL link in accordance with services. A connection handle is like an identifier for identifying a connection service. In the example in FIG. 5, two logical channels, a channel ID 1 and a channel ID 2, are set in the L2CAP processing portion 53, and connection handles A and B corresponding thereto, respectively, are provided. For the SCO link requiring synchronous communication, a connection handle M specially for SCO is provided.

Further, a buffer 54 for accommodating a packet passing through each link is provided which corresponds to each connection handle. The same communication processing is performed on data packets stored in the same buffer.

Figure 7:
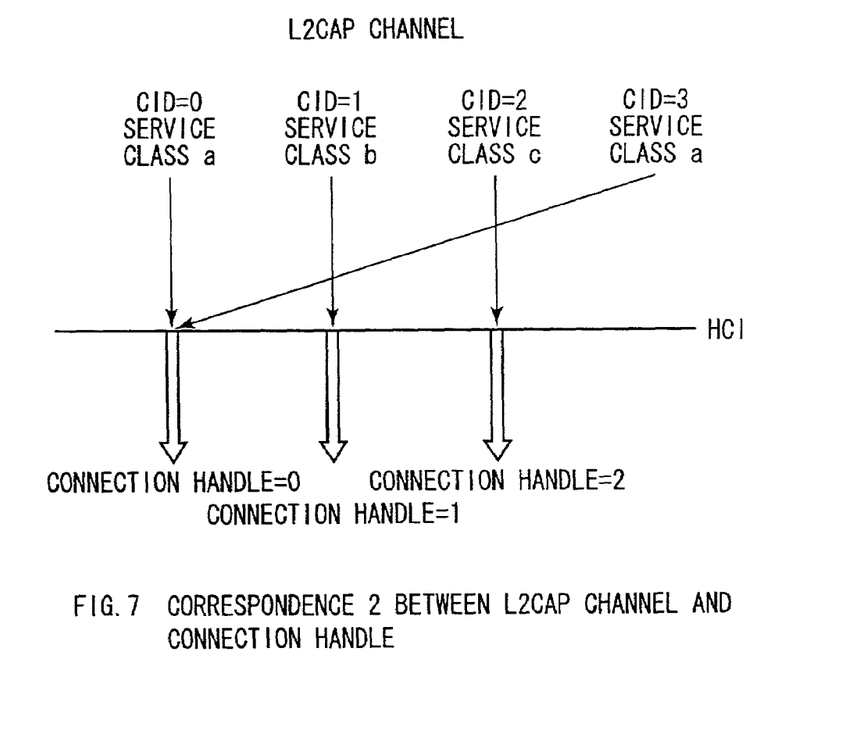
FIG. 7 is a diagram showing another example of correspondence between an L2CAP channel and a connection handle.

There are two approaches for mapping the L2CAP channels and the connection handles. One approach is to assign a connection handle sequentially to each logical channel set in the L2CAP (approach A). The other approach is to assign a same connection handle to L2CAP channels requesting a same service quality (that is, having a same QoS parameter) (Approach B), as shown in FIG. 7. In the example in FIG. 7, channels, ID0 to ID3, are assigned as the logical channels but the same connection handle 0 is assigned to those requesting a same service quality (service class a).

For example, service classes for categorizing communication quality may include:
(1) a service class giving the response speed preference;
(2) a service class giving the small transmission delay preference;
(3) a service class giving the small transmission distortion preference;
(4) a service class for which a certain band areas is guaranteed; and
(5) a service class categorized in accordance with a packet type (DM1/3/5, DH1/3/5, etc.).

The devices and/or applications applying each of the service classes may be as follows: The service class giving the response speed preference may be used by PC peripheral Bluetooth devices such as a mouse and a keyboard using an HID profile. The service class giving the small transmission delay preference is suitable for the application by a Bluetooth device for performing real-time voice communication by using the ACL. The service class giving the small transmission distortion preference is suitable for the application by a Bluetooth device which needs a small buffer size as much as possible in the receiver side, such as a built-in type device. The service class for which a certain band areas is guaranteed is suitable for the application by a Bluetooth device for performing synchronous communication of voice data and/or AV data over the SCO link. Also, even one single Bluetooth device may request multiple different services in accordance with applications at the same time (in fact, the present invention is especially suitable for such a case). In that case, a logical channel corresponding to a given service is also set.

The specific processes for performing assignment in accordance with service classes will be described later. In both of the approaches A and B, a connection handle is assigned to each requested service identified at the logical channel or to each of the same quality of services. Therefore, the services for the ACL link are not merged to one at the baseband.

Figure 8:
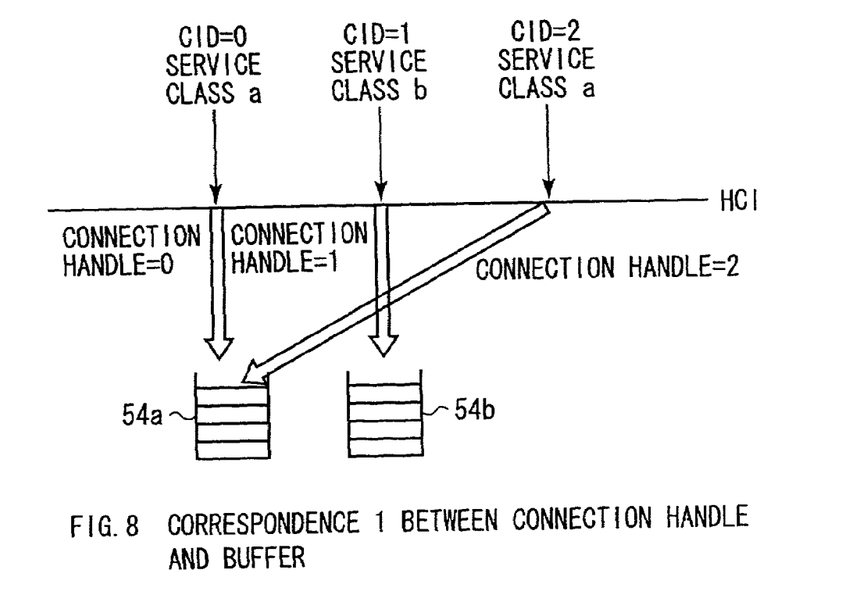
FIG. 8 is a diagram showing an example of correspondence between a connection handle and a buffer.

Next, a correspondence relationship between connection handles and buffers will be described. In an example in FIG. 8, a channel ID is given at the L2CAP in response to a service request sequentially and independently from any service class. One connection handle is assigned to one channel (Approach A). Here, information indicating service quality specified in each of the channels is also set in the corresponding connection handle. After that, with reference to each channel ID or service class of the connection handle, a packet to be passed through the ACL link is temporally stored in a buffer corresponding to the service class. For example, the channels with channel IDs 0 and 2 are requesting the same service class a, and a channel with channel ID 1 is requesting a different service class b. A packet (or communication data) requesting the service class a is stored in a buffer 54a, while a packet requesting the service class b is stored in a buffer 54b.

Figure 9:
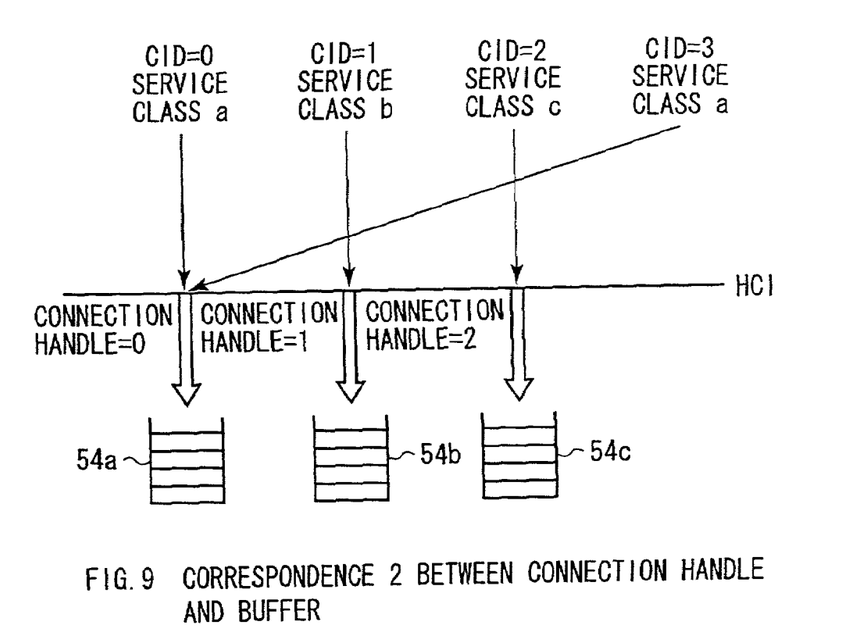
FIG. 9 is a diagram showing another example of correspondence between a connection handle and a buffer.

FIG. 9 shows another example of how connection handles and buffers correspond to each other. In the example in FIG. 9, a connection handle is assigned through the HCI in accordance with a service class of each channel (Approach B). Then, one buffer is set for one connection handle. For example, in the L2CAP, a same connection handle is assigned to channels with channel IDs 0 and 3 which are requesting the same service class. Then, information indicating the service class a is set in the connection handle. A different connection handle is assigned to a channel which is requesting another service class b or c, and a corresponding service class is set thereto. In accordance with the connection handle, the packet to be passed through the ACL link is stored temporally in each different buffer.

The assignment of buffers in accordance with the service classes shown in FIGS. 6 to 9 is based on the protocol layer configuration in FIG. 5. Thus, a specific connection ID and a buffer are assigned to a packet to be passed through the SCO link.

There are two methods for the buffer assignment. According to one method, available QoS classes and buffers are determined in advance in a fixed manner, and an upper layer represented by the application processing portion 41 (FIG. 4) or the baseband processing portion 45 assigns buffers suitable for requested quality of service. The application processing portion 41 specifies the buffer in accordance with a predetermined QoS parameter indicating quality of service requested by a given communication packet. The baseband processing portion 45 assigns a packet passed from the upper layer into a buffer for a QoS class in accordance with the Quality of service set in a connection handle corresponding to the packet. Alternatively, based on the quality of service of the connection handle corresponding to the packet passed through the HCI, an identifier indicating the quality of service is given to a predetermined area of the packet. The determination portion 46 checks and distributes the packet to the buffer corresponding to the identifier.

The method for specifying buffers in accordance with service classes in the fixed manner is suitable for devices for providing limited functions only as represented by built-in devices.

The other method is for adding, in response to a request, a buffer suitable for requested quality of service. This method is suitable for higher-performance, generic devices such as personal computers.

The specification of service classes is needed for the distribution to buffers in accordance with the service classes as described above. According to the present invention, the distribution to buffers is basically performed based on service classes (indicating quality of service corresponding to QoS parameters specified in the upper level layer) set in connection handles. However, when processing for adjusting a communication packet passed from the upper level layer into a baseband packet with the proper size, a payload header of a fragmented baseband packet is used.

Figure 10A:
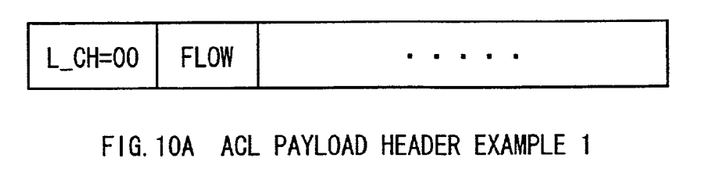
FIGS. 10A and 10B are diagrams showing examples of a payload header configuration for communication data for the distribution of buffers in accordance with quality of service.
Figure 10B:
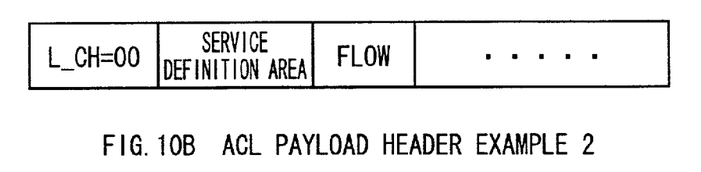

FIGS. 10A and 10B show a data structure of the payload header. An example in FIG. 10A is a payload header of a baseband packet passing through the ACL link, where a value 00 is set in an area in which a code L_CH is written. The value 00 in the L_CH area means that a service content is requested such as distribution request to buffers in accordance with QoS parameters written in the L2CAP QoS option. In other words, when a service requested for the L2CAP packet is written (that is, when the QoS option is specified), or when quality of service corresponding to a given connection handle is set, the packet processing portion 46 of the baseband processing portion 45 writes the value 00 into the L_CH area.

In an example in FIG. 10B, a service definition area is further provided for specifying a service class in a payload of a packet. A predetermined service class is written in the service definition area. Here, only a code corresponding to the service class may be written. In addition to the code, a detail QoS parameter specified in applications, the L2CAP or the HCI may be written. Further, a specified buffer or specific quality specification may be written. The quality is written on each service, for example, "a response is returned within 100 ms" or "delay should be 1 μs or below".

The determination portion 47 in the baseband processing portion 45 checks the value in the L_CH area or the description in the service definition area in the payload head of the packet passing through the ACL link to determine which buffer the packet is distributed to. Notably, when the QoS parameter is not specified in the upper level layer, a buffer for accommodating the packet may be determined by default. Alternatively, the packet may be distributed to a proper buffer. In this case, the presence of the QoS parameter is checked in the determination portion 47.

Figure 11:
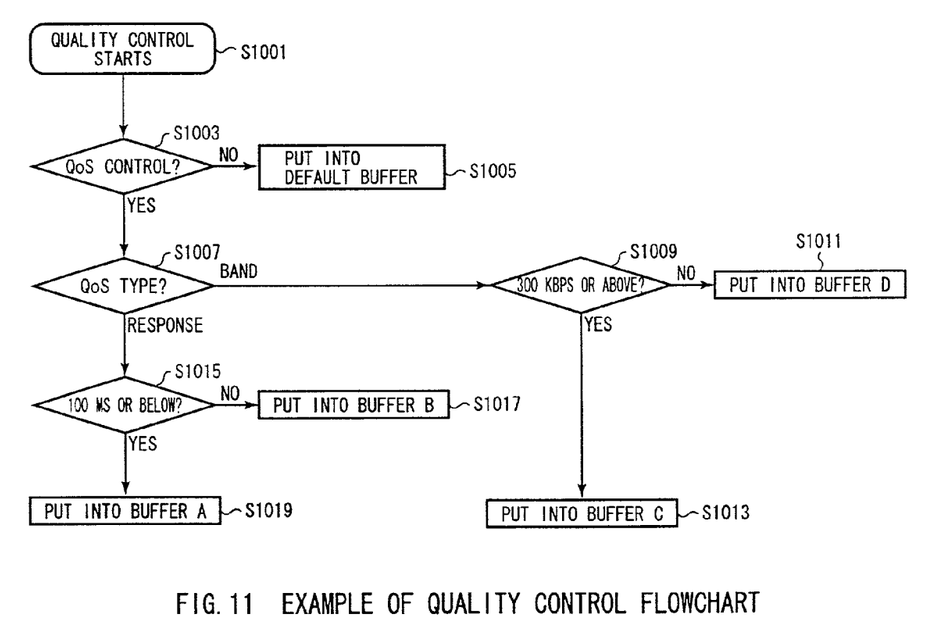
FIG. 11 is a flowchart showing communication quality control processing in accordance with services.

FIG. 11 shows a processing flow for service quality control. When the value in the L_CH area of the payload header is 00, the processing flow is started (step S1001). At step S1003, it is determined whether or not any QoS parameter is specified. If the QoS parameter is not specified, the packet is put into a default buffer at step S1005. If the QoS parameter is specified, the processing goes to step S1007, where a type of QoS is checked. For example, when the type of service requires communication in a certain band, the processing goes to step S1009. At step S1009, it is determined whether or not the required band is 300 kbps or above. If it is less than 300 kbps (that is, NO at step S1009), the packet is put into a buffer D at step S1011. If a band of 300 kbps or more is required, the packet is put into a buffer C at step S1013.

At step 1007, if the service type specifies responses, for example, the processing goes to step S1015, where it is determined whether or not a response speed of 100 ms or below is required. If the required response speed exceeds 100 ms, the processing goes to step S1017, where the packet is put into a buffer B. If the required response speed is 100 ms or below, the processing goes to step S1019, where the packet is put into a buffer A.

While the determination is performed on two types of services at step S1007 in FIG. 3 because of the limited space herein, the determination may be performed on three or more types of services, for example, on the continuity of images or on the limitation in delay time.

Figure 12:
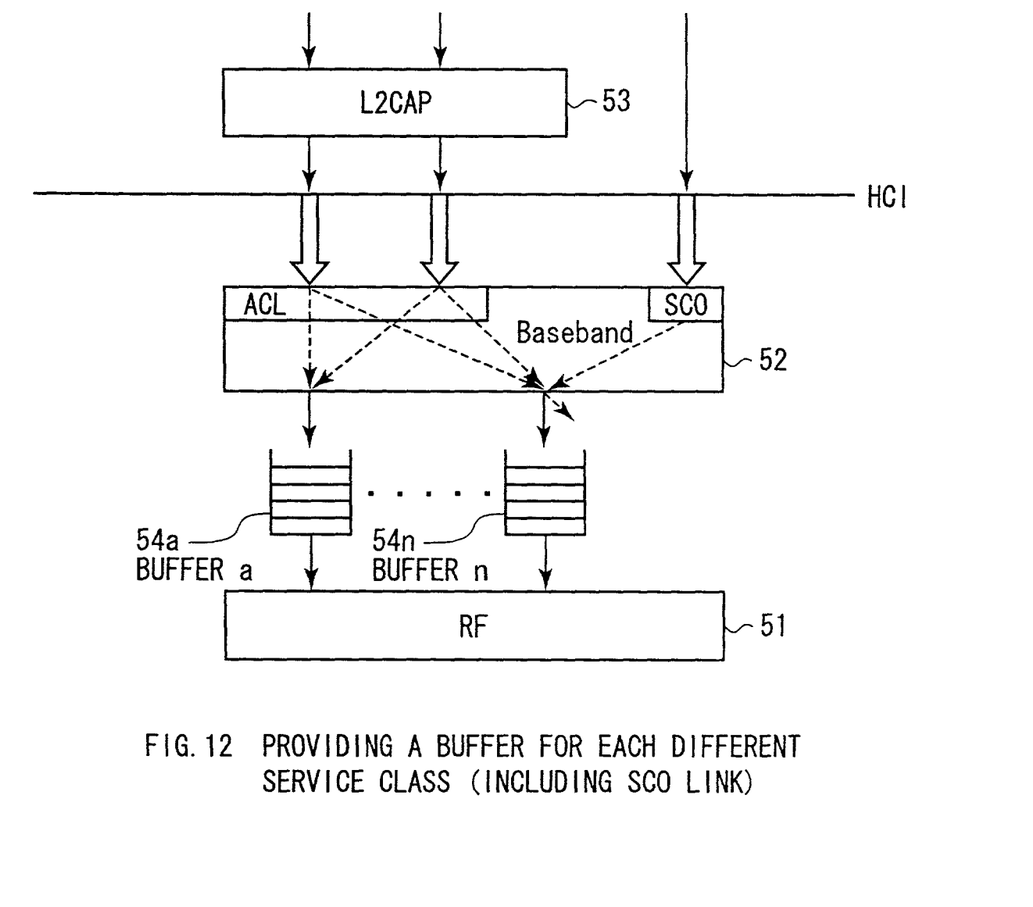
FIG. 12 is a diagram showing an example of a protocol layer configuration where a buffer is provided for each different service class including an SCO link.

FIG. 12 shows a first modification example of the protocol layer configuration shown in FIG. 5. In the configuration in FIG. 5, the buffer for packets sent through the SCO link is provided. However, in FIG. 12, the buffer for the SCO link is omitted. A service class is specified without any distinction between the ACL link and the SCO link. Then, the packet is distributed to a buffer in accordance with the service class. In this case, the baseband processing portion 45 performs the determination processing shown in FIG. 11 on packets including those sent through the SCO link.

Figure 13:
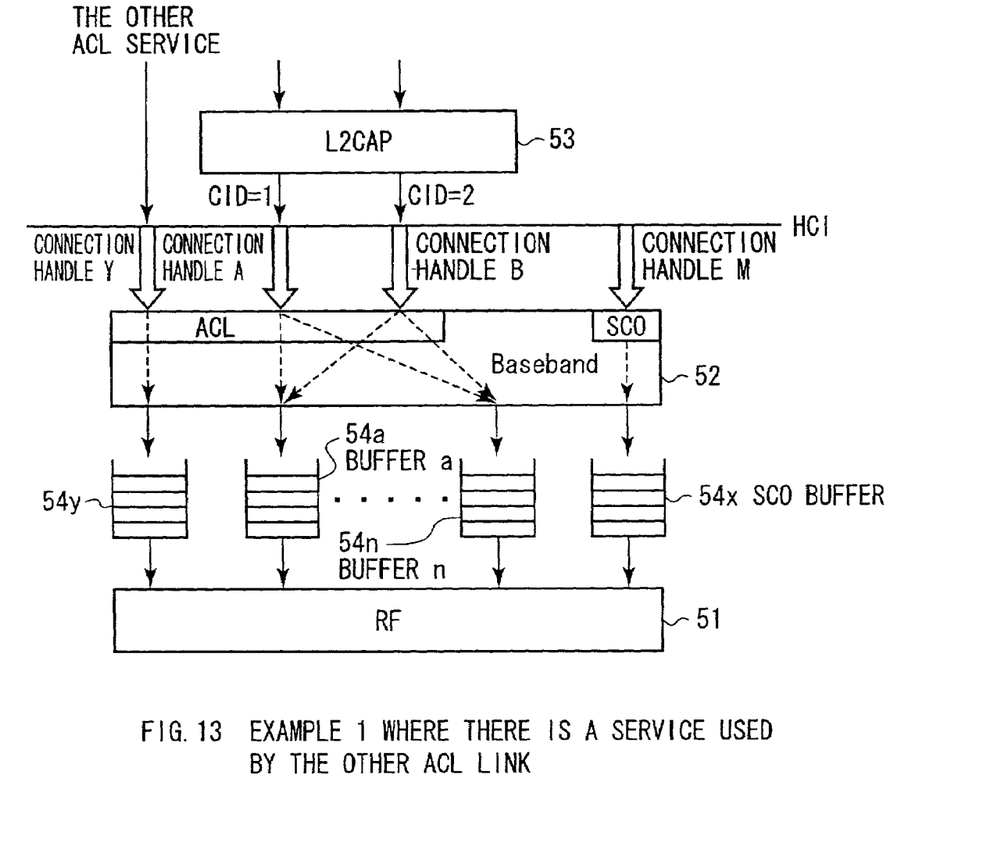
FIG. 13 is a diagram showing an example of a protocol layer configuration where a buffer is provided for each service including the other ACL link without the uses of L2CAP.

FIG. 13 shows a second modification example of the protocol layer configuration shown in FIG. 5. The description has been given with the assumption of the use of L2CAP as a protocol with the use of the ACL link. However, in practice, services can exist which use the ACL link without the use of the L2CAP, such as Unrestricted Digital Interface (UDI). Also, a corresponding connection handles may be assigned to each of those services. Alternatively, a connection handle may be assigned to each unique category (equal to a channel in L2CAP) within the service to distribute packets to buffers. In that case, the processing steps shown in FIG. 11 may be used.

In the example in FIG. 13, a connection handle Y and a buffer 54y for the other ACL link are assigned, and a connection handle M and a buffer 54x also for the SCO link are assigned. Within the ACL link using the L2CAP, distribution to buffers are performed in response to a request for each quality of service through the processing steps shown in FIG. 11.

Figure 14:
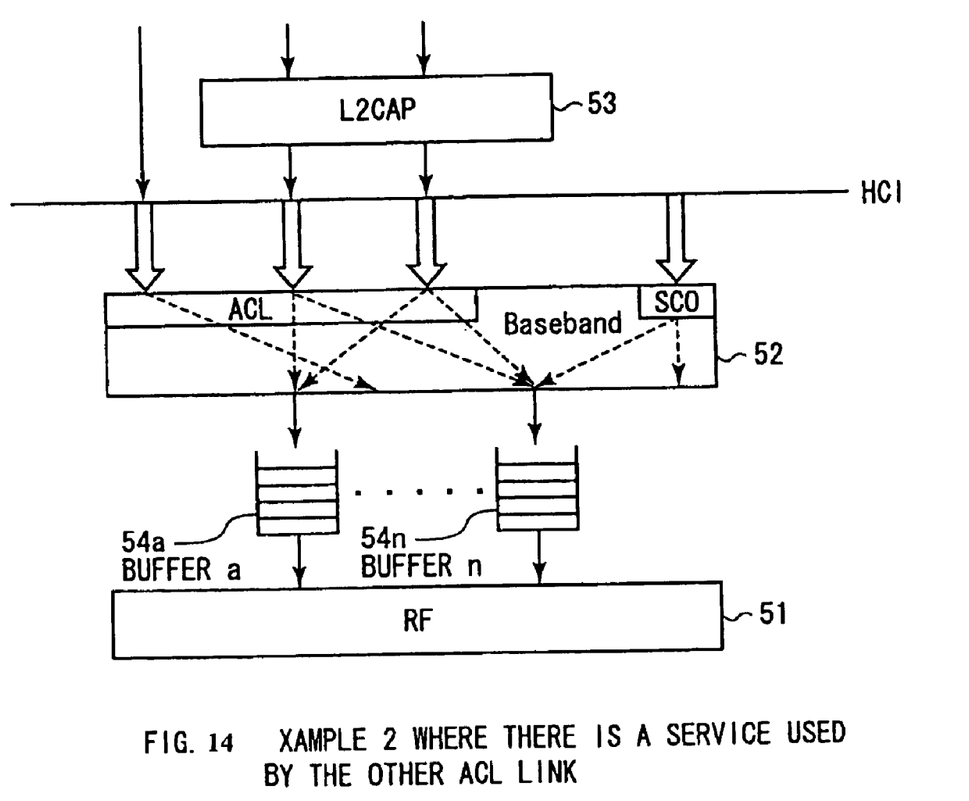
FIG. 14 is a diagram showing an example of a protocol layer configuration where a buffer is provided for each service including the other ACL link without the uses of L2CAP.

FIG. 14 shows a third modification example of the protocol layer configuration shown in FIG. 5. In the example in FIG. 14, both service requests for passing through the ACL link using non-L2CAP and service requests passing through the SCO link are also incorporated into the distribution to buffers in accordance with service classes. In that case, packets may be distributed to buffers corresponding to specified QoS parameters based on the service classes set in connection handles. Alternatively, a service identifier based on a given QoS parameter may be given to each of packets to distribute packets to corresponding buffers in accordance with the service identifiers.

Other than the configurations shown in FIGS. 13 and 14, a configuration is possible where packets passing through the ACL link may be determined all together regardless of the uses of the L2CAP with a special buffer for the SCO. Alternatively, a configuration is possible where service determination processing is performed on the ACL link with the L2CAP and the SCO link together with a special buffer for the non-L2CAP ACL link. The present invention functions on both configurations in the same manner.

What is claimed is:

1. A method for communicating packets in a communication device having a wireless communication interface via a wireless network to another communication device, comprising:

mapping, in a host controller interface, for a communication packet exchanged from a Logical Link Control Adaptation Protocol (L2CAP) upper layer, the host controller interface between the upper layer and a physical layer, one of multiple connection handles each identifying a respective service class requested by the communication packet to corresponding respective logical channels in the upper layer such that each logical channel is mapped to a respective connection handle;

specifying, in a predetermined area of a payload header of a base band communication packet, the service class requested by the communication packet which is exchanged from the upper layer;

determining said service class requested by said communication packet based on said payload header; and distributing said base band communication packet to one of a plurality of buffers corresponding to said specified service class depending upon said determining, and each of the plurality of buffers corresponding to a respective service class such that each connection handle identifying the same service class is corresponded to the same buffer;

wherein the service class indicates a particular quality of service and includes at least one of a response speed preference, a transmission delay preference, a distortion preference, a guaranteed particular band area, and a packet type.

2. A method for communicating packets according to claim 1, further comprising transmitting said base band communication packets in one of the plurality of buffers to the another communication device corresponding to said specified service class.

* * * * *